United States Patent [19]
Sohn

[11] Patent Number: 5,247,300
[45] Date of Patent: Sep. 21, 1993

[54] AUTOMATIC AUDIO/VIDEO SIGNAL COMBINATION APPARATUS

[75] Inventor: Sung W. Sohn, Seoul, Rep. of Korea

[73] Assignee: Goldstar Co., Ltd., Seoul, Rep. of Korea

[21] Appl. No.: 766,226

[22] Filed: Sep. 27, 1991

[30] Foreign Application Priority Data

Sep. 27, 1990 [KR] Rep. of Korea ............... 15409/1990

[51] Int. Cl.⁵ ..................... H03M 1/12; H04N 5/782
[52] U.S. Cl. ................................. 341/155; 341/141; 358/343; 358/341
[58] Field of Search ................. 341/155, 141, 108; 358/343, 341; 370/105.1; 375/106, 117; 360/19.1

[56] References Cited
U.S. PATENT DOCUMENTS 5,093,750 3/1992 Park et al. ...................... 358/343 X Primary Examiner—Sharon D. Logan

[57] ABSTRACT

An audio/video signal combination apparatus for a digital audio tape recorder, is capable of combining 10 bit audio signal with 5 bit video signal by an automatic addressing, comprising analog/digital converters for converting audio signal and video signal into 10 bit and 5 bit digital data, a frame memory for storing digitized video signal by one frame, a digital signal processor for processing the 10 bit audio data and the 5 bit video data to one byte recording signal, and an automatic addressing unit for inputting the 5 bit video data stored in the frame memory to the digital signal processor when the digital signal processor reads the 10 bit audio data.

7 Claims, 3 Drawing Sheets

AUTOMATIC AUDIO/VIDEO SIGNAL COMBINATION APPARATUS

BACKGROUND OF THE INVENTION

1. Field of the Invention

The present invention relates to an audio/video signal recording apparatus for use in a digital audio tape recorder (hereinafter, referred to as a DAT), and particularly to an audio/video signal combination apparatus for combining a picture cell of a video signal and R.G.B. signal addresses of the picture cell with an audio signal.

2. Description of the Prior Art

In general, a DAT is an appliance for obtaining a high quality sound by recording an audio signal to a tape after converting the audio signal into a digital signal.

It is a recent trend to add a video recording/reproducing function to the DAT having an audio recording/reproducing function.

In a conventional DAT, since video data compressing procedures in a video system vary and the timing relationships are complicated, the video recording function is limited. Accordingly, it has been difficult to record the audio signal and video signal in a combination thereof by precisely synchronizing the audio and video signals.

SUMMARY OF THE INVENTION

Accordingly, it is an object of the present invention to provide an automatic audio/video combination apparatus for use in a DAT which is capable of obtaining a still picture and a high quality audio output synchronized with the still picture by recording a video signal and an audio signal to a tape in a dividing possession manner by an automatic addressing.

Another object of the present invention is to provide an automatic audio/video signal combination apparatus for converting an audio signal and a video signal into digital data and then storing video data to a frame memory, inputting audio data to a digital signal processor and then inputting video data to the digital signal processor by controlling the frame memory through an automatic addressing unit, and combining the audio data and video data with a control signal to a composite signal of one byte by the digital signal processor.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
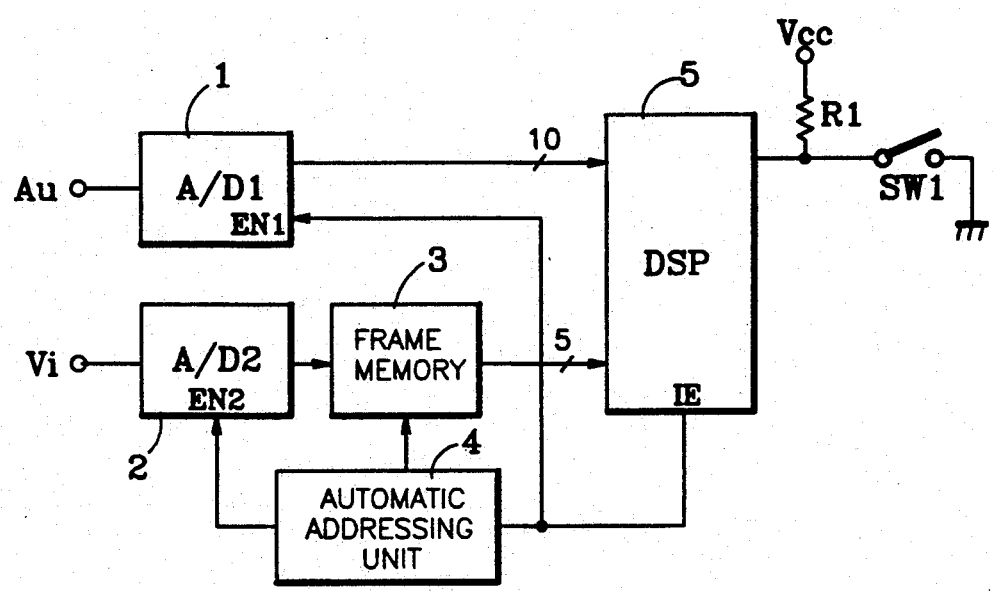
FIG. 1 is a block diagram showing an audio/video signal combination apparatus according to the present invention.
Figure 2:
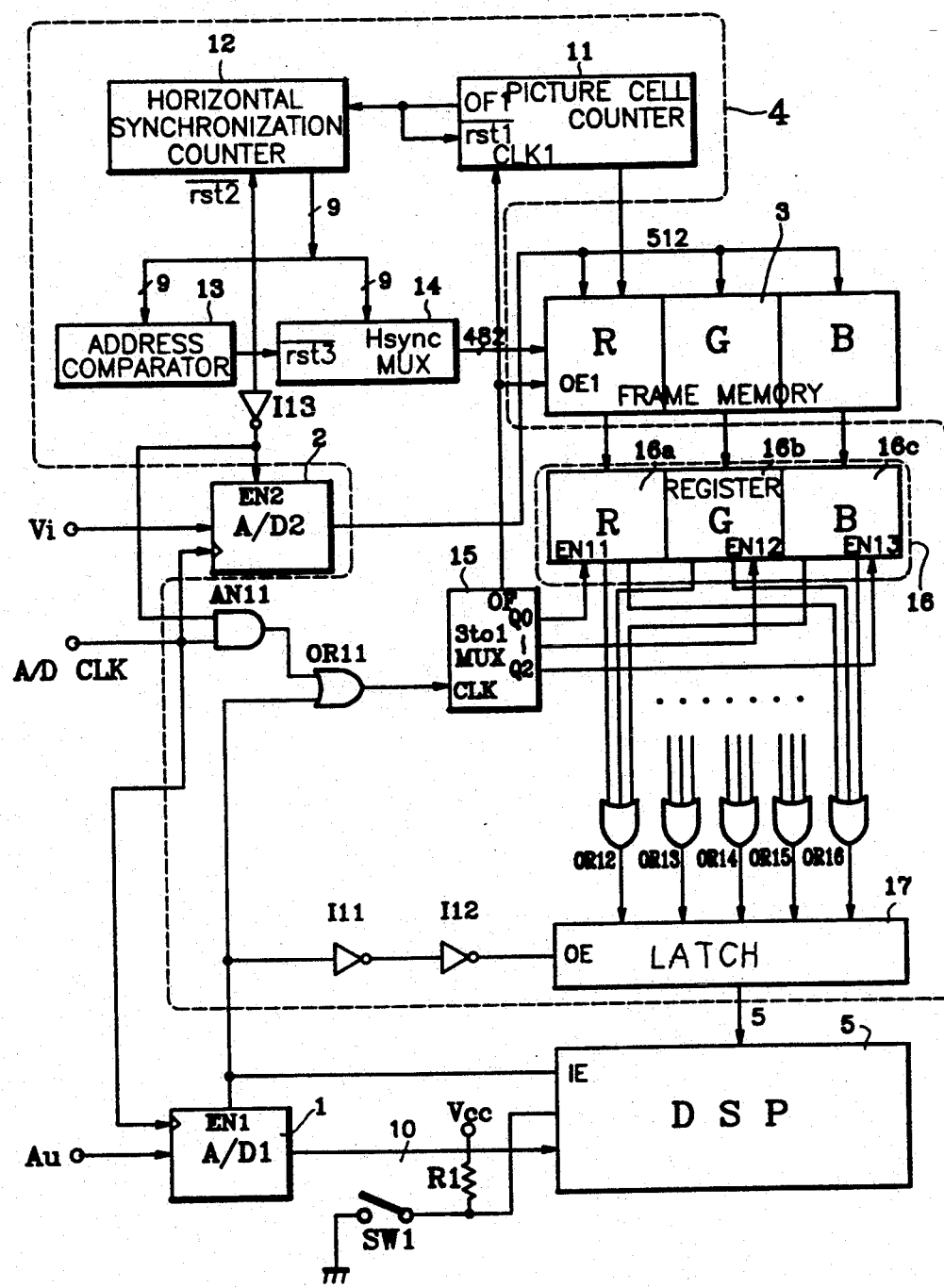
FIG. 2 is a detailed circuit diagram of FIG. 1.

Referring now in detail to the drawings for the purpose of illustrating preferred embodiments of the present invention, the audio/video signal combination apparatus as shown in FIGS. 1 and 2, comprises a first analog/digital converter and a second analog/digital converter 2 for converting an audio signal (Au) and a still picture video signal (Vi) into a digital signal, respectively, a frame memory 3 for storing the digital video signal of one frame which is converted into a digital signal by the second analog/digital converter 2, a digital signal processor (DSP) 5 for encoding and interleaving the digitized audio signal and video signal and processing an audio signal (10 bit), a video signal (5 bit) and a control signal (1 bit) by a selection switch SW1 by one byte in a dividing possession manner, and an automatic addressing unit 4 for automatically increasing an address so that the digital video signal stored in the frame memory 3 is inputted by five bits consecutively in the order of R.G.B. when the digital audio signal is inputted by ten bits in response to an input enable signal (IE) of the digital signal processor 5.

FIG. 2 which is a detailed circuit diagram of the audio/video signal combination apparatus. The automatic addressing unit 4 comprises a picture cell counter 11 for designating the address of 512 picture cells of the frame memory 3, a horizontal synchronizing counter 12 for counting an overflow signal (OF1) of the picture cell counter 11, a horizontal synchronizing multiplexer (MUX) 14 for outputting an output from the horizontal synchronizing counter 12 as a horizontal synchronizing address of the frame memory 3, an address comparator 13 for generating reset signals rst3 and rst3 of the horizontal synchronizing counter 12 and horizontal synchronizing multiplexer 14 when the output of the horizontal synchronizing counter 12 becomes a one-frame horizontal synchronizing value (482) and generating an enable signal EN2 of the second analog/digital converter 2 through an inverter 113, registers 16a, 16b and 16c each for storing R.G.B. signals of the frame memory 3 by five bits, a 3-to-1 multiplexer 15 for outputting 3 bit output signals Q0, Q1 and Q2 as respective enable signals EN11, EN12 and EN13 of the registers 16a, 16b and 16c by receiving an output from an OR gate OR11 after combining the enable signal EN2 of the second analog/digital converter 2 with an analog/digital converting clock (A/D CLK) by an AND gate AN11 and with the input enable signal (IE) of the digital signal processor 5 by the OR gate OR11 and outputting its overflow signal OF as an output enable signal OE1 of the frame memory 3 and a clock signal CLK1 of the picture cell counter 11, OR gates OR12 to OR16 for ORing five bit R.G.B. signals of the registers 16a, 16b and 16c, respectively, and a latch 17 for inputting the five bit output signals of the RO gates OR12 to OR16 to the digital signal processor 5 by receiving the input enable signal (IE) of the digital signal processor 5 as an output enable signal (OE) after delaying through inverters I11 and I12. In the drawing, the first analog/digital converter 1 is adapted to convert an audio signal (Au) into 10 bit digital signal, and the selection switch SW1 is adapted to select the audio signal or the audio/video composite signal.

Figure 3:
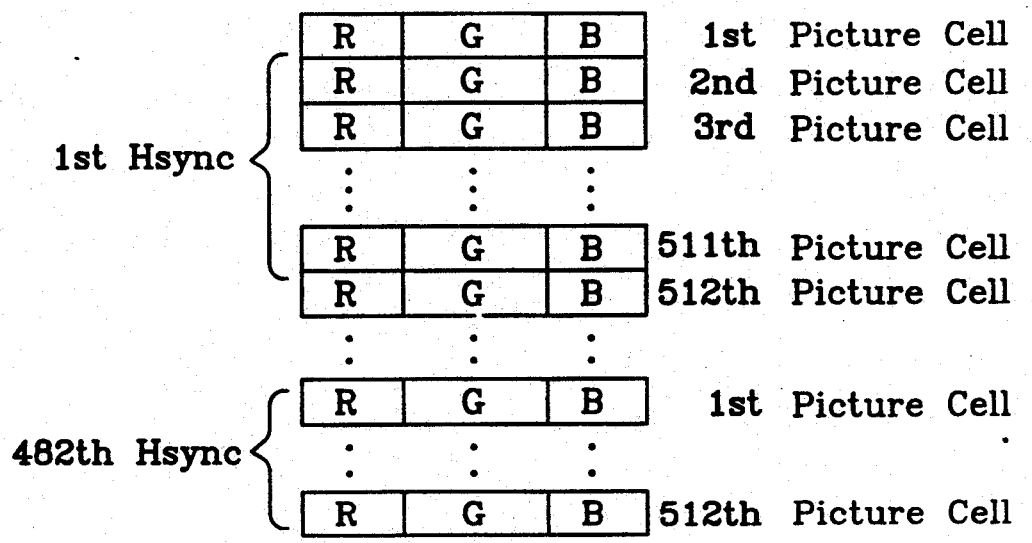
FIG. 3 is a diagram showing a frame memory according to the present invention.
Figure 4:
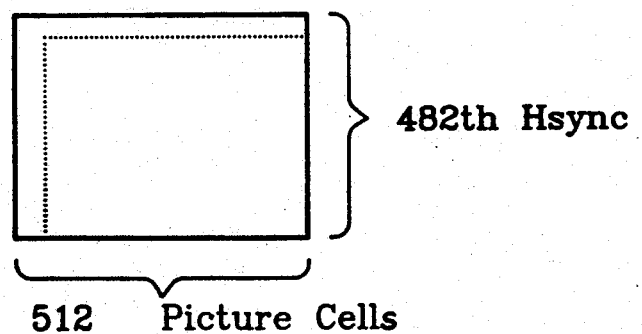
FIG. 4 is an explanatory view showing a one-frame picture of the present invention.

The automatic audio/video signal combination apparatus of the present invention operates as follows:

As shown in FIGS. 3 and 4, in order to record a still picture information in a DAT, 10 bits are assigned for the audio signal, 5 bits for the video signal and 1 bit for a control signal and those signals are combined. That is, the data digitized through the analog/digital converters 1 and 2 are synchronized as much as the assigned bit number and inputted to the digital signal processor 5. The control bit is adapted to discriminate whether among the 16 bit data and audio signal is to be recorded only or an audio/video composite signal is to be recorded. The control bit is controlled by a user through the selection switch SW1 to record "1" or "0" to the last bit and the reproduction control is carried out by a reproducing system with reference to the control bit. And, since the amount of the signal digitized by one-frame video signal (Vi) comes to several second times as that of the signal digitized by an audio signal (Au), the video signal (Vi) is digitized and stored to the frame memory 3 by one time at every several seconds and the automatic addressing is carried out with respect to the frame memory 3 so that the R.G.B. signals of the frame memory 3 are inputted to the digital signal processor 5.

As shown in FIGS. 3 and 4, one frame picture is constituted with one horizontal line of 512 picture cells and 482 horizontal lines, and since one picture cell has its own R.G.B. information, the total amount of unit digital data of a video signal required in one frame is $512 \times 482 \times 3 = 740$ K.

That is, since the video signal for one frame is almost identical to a unit of 740 K of audio data, the frame memory 3 must have the capacity of 15 bit $\times$ 250 K to store the video signal data for one frame.

First of all, when an input enable signal (IE) is outputted from the digital signal processor 5, an audio signal (Au) is converted into a digital signal through the first analog/digital converter 1 so that 10 bit signal is inputted, and the input enable signal (IE) is inputted to the 3-to-1 multiplexer 15 through the OR gate OR11 to determine the outputs Q0 to Q2 of the 3-to-1 multiplexer 15 and then applied to the latch 17 as an output enable signal (OE) after having been delayed at the inverters I11 and I12. Accordingly, R.G.B. outputs from the registers 16a to 16c are ORed by the OR gates OR12 to OR16, respectively, and latched by the latch 17, and then a 5 bit signal of digital data of the latched video signal is inputted to the digital signal processor 5. That is, the digital signal processor 5 receives in timing a 10 bit audio signal and a 5 bit video signal.

Since the 3-to-1 multiplexer 15 whose output is determined in response to the input enable signal (IE) of the digital signal processor 5, enables the registers 16a, 16b and 16c consecutively, the 5 bit R.G.B. data stored in the registers 16a to 16c are latched by the latch 17 in turn to a 5 bit R data, a 5 bit G data and a 5 bit B data through the OR gates OR12 to OR16. At this moment, the out enable signal (OE) of the latch 17 becomes active by the input enable signal (IE) of the digital signal processor 5 which is delayed as much as a propagation delay through inverter gates I11 and I12, and the latched 5 bit data is inputted to the digital signal processor 5.

That is, when the digital signal processor 5 makes the input enable signal (IE) active, a 10 bit audio data is inputted and after propagation delay of the inverter gates I11 and I12 a 5 bit video data is inputted from the latch 17 so as to produce a one byte composite data together with the one bit control signal and also 5 bit R.G.B. data are consecutively inputted. For this purpose, the first analog/digital converter 1 is used for 10 bit and the second analog/digital converter 2 is used for 5 bit so as to convert R.G.B. data of one picture cell into a respective 5 bit data, and also the registers 16a, 16b and 16c and the latch 17 are used for 5 bit, respectively.

Meanwhile, the 3-to-1 multiplexer 15 makes its outputs Q0 to Q2 active in turn and generates an overflow signal (OF) which is applied to the output enable OE1 of the frame memory 3 and the clock LCK1 of the picture cell counter 11, so that the picture cell counter 11 increases the address and designates next picture cell and the frame memory 3 outputs each 5 bit R.G.B. data of corresponding address to the registers 16a to 16c. And, the picture cell counter 11 generates an overflow OF1, when the designation of 512 picture cell address of one horizontal line is finished, and applies the overflow OF1 to the clock of the horizontal synchronizing counter 12 and then begins the counting operation for designating the 512 picture cell address of the next horizontal line. As the picture cell counter 11 increases the picture cell address of the frame memory 3 in response to the overflow signal (OF) of the 3-to-1 multiplexer 15, and generates an overflow OF1 after counting the 512 picture cells of one horizontal line, the horizontal synchronizing counter 12 counts the horizontal synchronizing signal and the horizontal synchronizing multiplexer 14 designates it as a horizontal synchronizing address of the frame memory 3.

When the counted value of the horizontal synchronizing counter 12 becomes 482 being a horizontal line value of one frame, the horizontal synchronizing counter 12 and the horizontal synchronizing multiplexer 14 are reset and the second analog/digital converter 2 is operated. As a result, a still picture signal (Vi) is converted into a digital signal by the second analog/digital converter 2 and a one-frame data is stored in the frame memory 3. At this moment, since an analog/digital conversion clock (A/DCK) is applied via an AND gate AN11 to the clock of the 3-to-1 multiplexer 15, the picture cell counter 11 designates the picture cell address of the frame memory 3 and stores still picture video signal data for one frame for the first address to 512th picture cell address of 482th horizontal line.

As described above in detail, the present invention provides the effect that it is easy to obtain the combination of video signal and audio signal by automatically synchronizing the digital audio and video signals.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. An audio/video signal combination apparatus, comprising:
   a first analog/digital converter for converting an audio signal into audio digital data,
   a second analog/digital converter for converting a video signal into video digital data,
   a frame memory for storing said video digital data from said second analog/digital converter,
   a digital signal processor for receiving said audio digital data form said first analog/digital converter by outputting an input enable signal and processing said video digital data form said frame memory, and an automatic addressing unit for controlling an output from said frame memory and said second analog/digital converter by synchronizing said video digital data from said frame memory with said audio digital data in response to said input enable signal of said digital signal processor, to produce a synchronized digital signal.

2. The apparatus of claim 1, wherein said automatic addressing unit further comprises:

first to third registers, each for storing a video signal outputted from said frame memory, first to fifth OR gates, each for ORing by bit outputs from said first to third registers, a latch for inputting outputs of said first to fifth OR gates to said digital signal processing unit, a 3-to-1 multiplexer for combining an output from a first AND gate which combines an enable signal and an analog/digital conversion clock signal of the second analog/digital converter, with the input enable signal from said digital signal processor by an OR gate, outputting consecutively enable signals of said first to third registers in response to the combined signal, and outputting an overflow signal, a picture cell counter for increasing a picture cell address of said frame memory in response to the overflow signal of said 3-to-1 multiplexer and being automatically reset when the designation of one horizontal line address is completed, a horizontal synchronizing counter for counting a horizontal line of the frame memory in response to the output of said picture cell counter, a horizontal synchronizing multiplexer for outputting the output signal of said horizontal synchronizing counter as the horizontal line address signal of the frame memory, and an address comparator for resetting the horizontal synchronizing counter and the horizontal synchronizing multiplexer when the counting of the one-frame horizontal line of the frame memory is completed and outputting the second enable signal to the second analog/digital converter.

3. The apparatus of claim 1, wherein said digital signal processor is applied with an audio signal of ten bits, a video signal of 5 bits and a control signal of one bit.

4. An audio/video signal combination apparatus, comprising:

analog/digital converting means for converting an audio signal and a video signal into a digital audio signal and a digital video signal; and synchronizing means for synchronizing the digital audio signal and the digital video signal by reading the digital audio signal and the digital video signal to a magnetic tape in a time divisional manner using automatic addressing, said synchronizing means including, frame memory means for storing a frame of the digital video data, automatic addressing means for synchronizing the digital video data stored n said frame memory means with the digital audio data and a control signal, in response to an input enable signal to produce synchronized digital audio/video data, and digital signal processing means for processing the synchronized digital audio/video data and recording the processed digital audio/video data to the magnetic tape.

5. The audio/video signal combination apparatus of claim 4, said automatic addressing means including, means for accessing each pixel of the frame of the digital video data stored in said frame memory means, means for multiplexing a red, green and blue component of each pixel of the frame of the digital video data, and means for latching the multiplexed digital video data in response to the input enable signal to thereby synchronize the multiplexed digital video with the digital audio data.

6. The audio-video signal combination apparatus of claim 4, wherein a sample of the digital video data, a sample of the digital audio data and the control signal comprise one byte.

7. The audio/video signal combination apparatus of claim 6, wherein when the control signal indicates digital video and audio data, the sample of the digital video signal is 5 bits and the sample of the digital audio signal is 10 bits and when the control signal indicates only digital audio data, the sample of the digital audio data is 15 bits.

* * * * *